US012782171B2

(12) United States Patent
Watanabe

(10) Patent No.: US 12,782,171 B2
(45) Date of Patent: Nov. 3, 2026

(54) PRESSURE SENSOR MODULE

(71) Applicant: ROHM Co., LTD., Kyoto (JP)

(72) Inventor: Hajime Watanabe, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 296 days.

(21) Appl. No.: 18/610,625

(22) Filed: Mar. 20, 2024

(65) Prior Publication Data

US 2024/0328836 A1 Oct. 3, 2024

(30) Foreign Application Priority Data

Mar. 27, 2023 (JP) ................................. 2023-049798

(51) Int. Cl.
*G01D 11/24* (2006.01)
*G01L 1/00* (2006.01)

(52) U.S. Cl.
CPC .............. *G01D 11/245* (2013.01); *G01L 1/00* (2013.01)

(58) Field of Classification Search
CPC ................................ G01D 11/245; G01L 1/00
See application file for complete search history.

(56) References Cited

U.S. PATENT DOCUMENTS 5,616,521 A * 4/1997 Cook, Sr. .............. G01L 19/143 29/840
6,590,777 B2 * 7/2003 Morino .................. H01H 35/24 361/736
2016/0061677 A1 * 3/2016 Han ...................... B81B 7/0048 438/51
2018/0172531 A1 * 6/2018 Nishiyama ............ G01L 9/0048

FOREIGN PATENT DOCUMENTS

WO WO2022/080130 4/2022

* cited by examiner

*Primary Examiner* — David Z Huang
(74) *Attorney, Agent, or Firm* — CHIP Law Group

(57) ABSTRACT

Provided is a sensor module including a box-shaped structure that includes a bottom surface portion and a side surface portion arranged upright with respect to the bottom surface portion, a sensor unit that is mounted on the bottom surface portion of the box-shaped structure and that includes a pressure sensor body, and a cover member that is placed on the side surface portion in such a manner as to cover the sensor unit, in which an opening for allowing communication between a space inside the box-shaped structure housing the sensor unit and outside is formed on the side surface portion in the box-shaped structure.

7 Claims, 7 Drawing Sheets

PRESSURE SENSOR MODULE

CROSS REFERENCE TO RELATED APPLICATIONS

This application claims priority benefit of Japanese Patent Application No. JP 2023-049798 filed in the Japan Patent Office on Mar. 27, 2023. Each of the above-referenced applications is hereby incorporated herein by reference in its entirety.

BACKGROUND

The present disclosure relates to a sensor module.

One example of a sensor module includes a sensor module including a pressure sensor proposed in PCT Patent Publication No. WO2022/080130. The pressure sensor is manufactured with use of a micro-electro-mechanical system (MEMS) technology applied to microfabrication of a semiconductor device. The pressure sensor is mounted on an electronic component that processes a signal detected by the pressure sensor. The electronic component and the pressure sensor are housed in a package. A cover member is attached to the package in such a manner as to cover the housed pressure sensor, etc.

The package housing the pressure sensor, etc., is installed on an installation board. A plurality of electrode pads are arranged on an installation surface of the package facing the installation board. The pressure sensor and the electronic component are electrically connected to the corresponding electrode pads. Meanwhile, circuit patterns are formed on the installation board. The plurality of electrode pads installed on the installation board are electrically connected to the corresponding circuit patterns.

DETAILED DESCRIPTION

Figure 1:
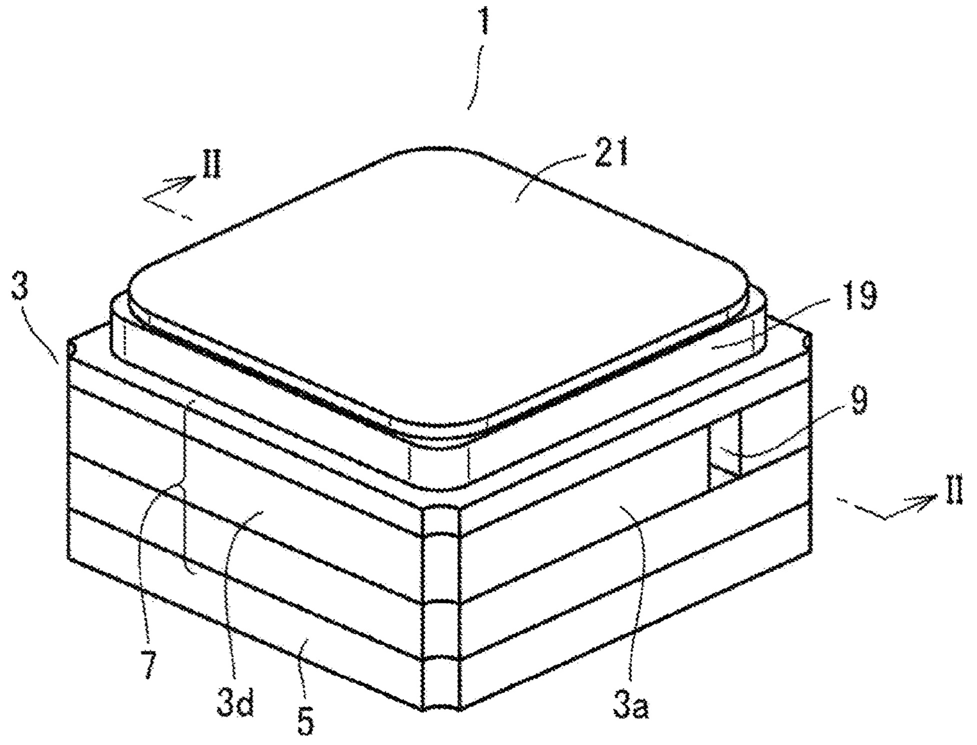
FIG. 1 is a perspective view illustrating an example of a sensor module according to an embodiment.
Figure 2:
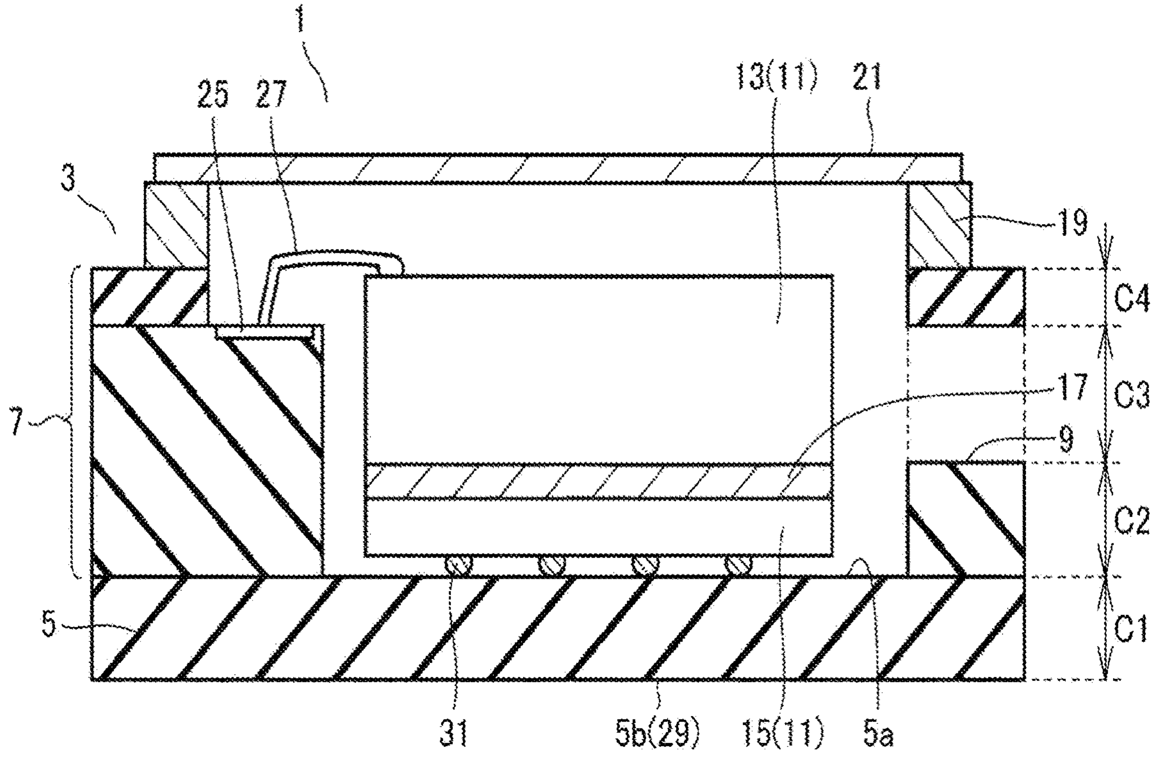
FIG. 2 is a cross-sectional view taken along a cross-section line II-II illustrated in FIG. 1 in the embodiment.
Figure 3:
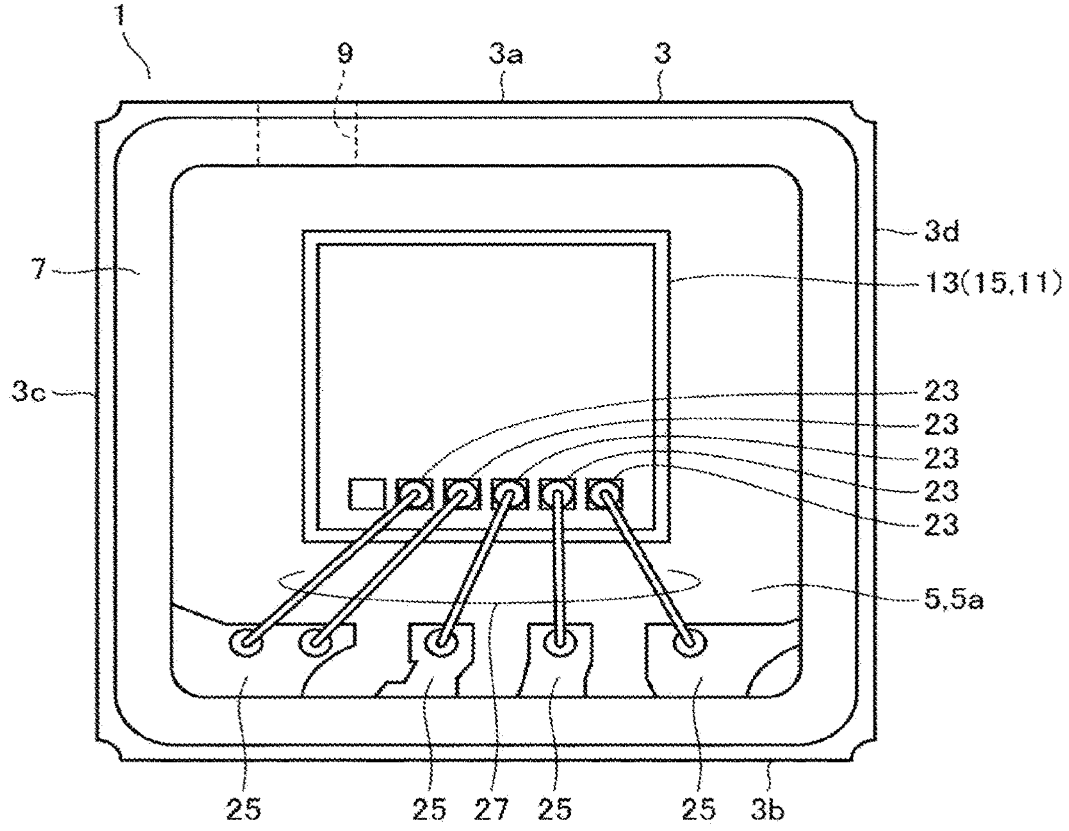
FIG. 3 is a top view illustrating a structure inside the sensor module in the embodiment.
Figure 4:
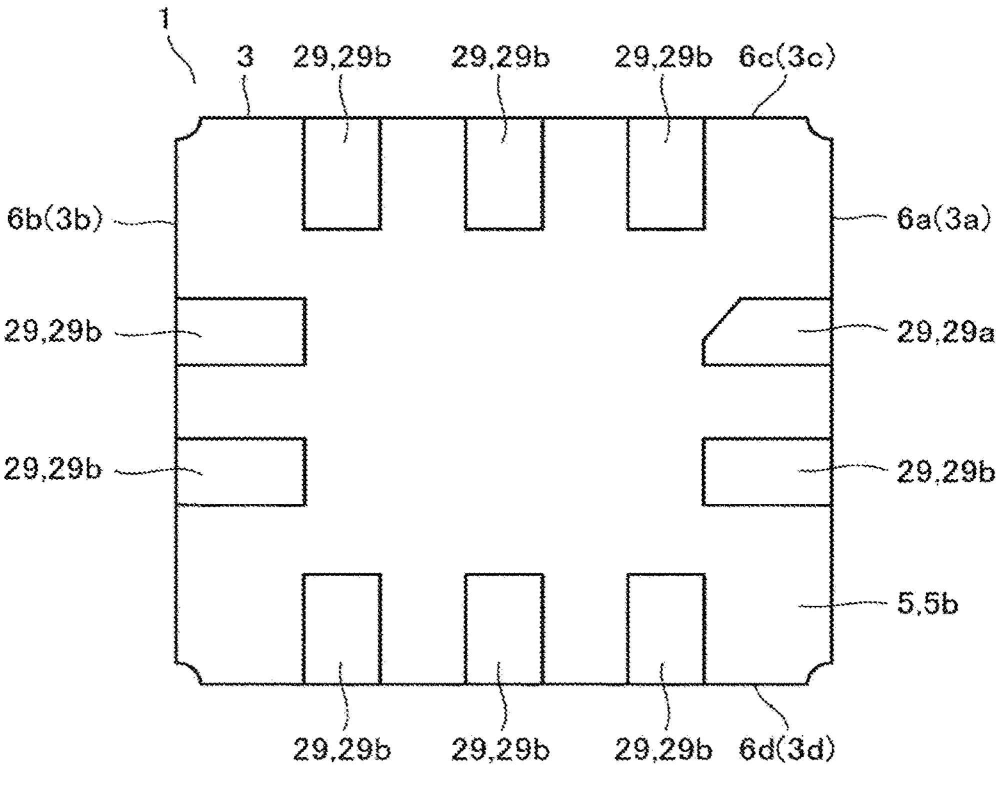
FIG. 4 is a bottom view illustrating an example of installation terminals arranged on a bottom surface portion of the sensor module in the embodiment.

An example of a sensor module according to an embodiment will be described. As illustrated in FIGS. 1, 2, 3, and 4, a sensor module 1 includes a box-shaped package 3 (box-shaped structure), a sensor unit 11, and a cover member 21.

The box-shaped package 3 includes a bottom surface portion 5 and a side surface portion 7. The package 3 (sensor module 1) has a square shape in plan view as viewed from an upper side. The package 3 includes a first plane portion 3*a* (one plane portion; one side), a second plane portion 3*b*, a third plane portion 3*c* (another plane portion; another side), and a fourth plane portion 3*d* that form the square shape of the package 3. Each of the first to fourth plane portions 3*a* to 3*d* includes a surface of the corresponding side surface portion 7 and a surface (end surface) of the bottom surface portion 5 flush with the surface. Note that the square shape is not intended to be a square shape in a strict geometric sense, and the square shape is intended to be a shape that can be recognized as a square shape at a glance. The square shape may also have a manufacturing error, for example.

The side surface portion 7 is formed upright with respect to the bottom surface portion 5. The package 3 has a ceramic layered structure obtained by layering and firing a plurality of green sheets. The bottom surface portion 5 is formed from, for example, three relatively thin ceramic layers. The side surface portion 7 is formed from, for example, three ceramic layers including relatively thick ceramic layers.

A thickness C1 of first to third ceramic layers (bottom surface portion 5) is, for example, approximately 180 μm. A thickness C2 of a fourth ceramic layer (lowermost layer of the side surface portion 7) is, for example, approximately 200 μm. A thickness C3 of a fifth ceramic layer (center layer of the side surface portion 7) is, for example, approximately 240 μm. The dimension in the height direction of an opening 9 described later is approximately 0.24 mm (240 μm). A thickness C4 of a sixth ceramic layer (uppermost layer of the side surface portion 7) is, for example, approximately 100 μm.

The sensor unit 11 is housed in the package 3. The sensor unit 11 includes a pressure sensor body 13 and an electronic component 15. The pressure sensor body 13 is manufactured with use of the MEMS technology. A thin plate diaphragm (not illustrated) that detects changes in pressure is formed on the pressure sensor body 13. The electronic component 15 has a function of processing an electrical signal detected by the pressure sensor body 13. The electronic component 15 includes an application specific integrated circuit (ASIC) element.

Electrode pads 25 are formed on the side surface portion 7 in the package 3. The pressure sensor body 13 and the electrode pads 25 are electrically connected by bonding wires 27. The bottom surface portion 5 in the package 3 includes a mount surface 5*a* and an installation surface 5*b*. The sensor unit 11 is mounted on the mount surface 5*a* through bumps 31. The cover member 21 is attached to cover the sensor unit 11. The cover member 21 is attached to the package 3 through a cover member bonding portion 19.

The opening 9 for allowing communication between the space inside the package 3 housing the sensor unit 11 and the outside of the package 3 is formed on the side surface portion 7 in the package 3. The opening 9 is positioned on the first plane portion 3*a* and formed at a position (height) facing the pressure sensor body 13 in the sensor unit 11. The opening 9 is formed in, for example, a relatively thick ceramic layer among the three ceramic layers included in the side surface portion 7.

The installation surface 5*b* in the bottom surface portion 5 faces an installation board 41 (see FIG. 6) in a state in which the sensor module 1 is installed on the installation board 41. An end portion 6*a* and an end portion 6*b* facing each other at a distance in one direction are positioned on the square-shaped installation surface 5*b*. An end portion 6*c* and an end portion 6*d* facing each other at a distance in another direction orthogonal to the one direction are also positioned on the installation surface 5*b*.

A plurality of installation terminals 29 are arranged on the installation surface 5*b*. The sensor unit 11 is electrically connected to the corresponding installation terminals 29 through the electrode pads 25 and the bonding wires 27. The sensor unit 11 is also electrically connected to the corresponding installation terminals 29 through the bumps 31. The installation terminals 29 include one installation terminal 29*a* and nine installation terminals 29*b*.

The installation terminal 29*a* serves as a positioning terminal (pin) for adjusting the position of the sensor module 1 with respect to the installation board 41 (see FIG. 6), and the pattern (plane shape) of the installation terminal 29*a* is different from the pattern of the installation terminals 29*b*. The opening 9 is so formed on the side surface portion 7 in the package 3 as to correspond to the position where the installation terminal 29*a* is arranged. The opening 9 is formed at a position closer to the third plane portion 3*c* (another plane portion) with respect to the center in the length direction of one side of the first plane portion 3*a* (one plane portion).

The installation terminals 29 are formed in such a manner as to extend from the positions corresponding to the ends of the package 3 toward the inside of the installation surface 5*b*. One installation terminal 29*a* and one installation terminal 29*b* are arranged in such a manner as to extend from the end portion 6*a* toward the end portion 6*b*. Two installation terminals 29*b* are arranged in such a manner as to extend from the end portion 6*b* toward the end portion 6*a*. Three installation terminals 29*b* are arranged in such a manner as to extend from the end portion 6*c* toward the end portion 6*d*. Three installation terminals 29*b* are arranged in such a manner as to extend from the end portion 6*d* toward the end portion 6*c*.

Figure 5:
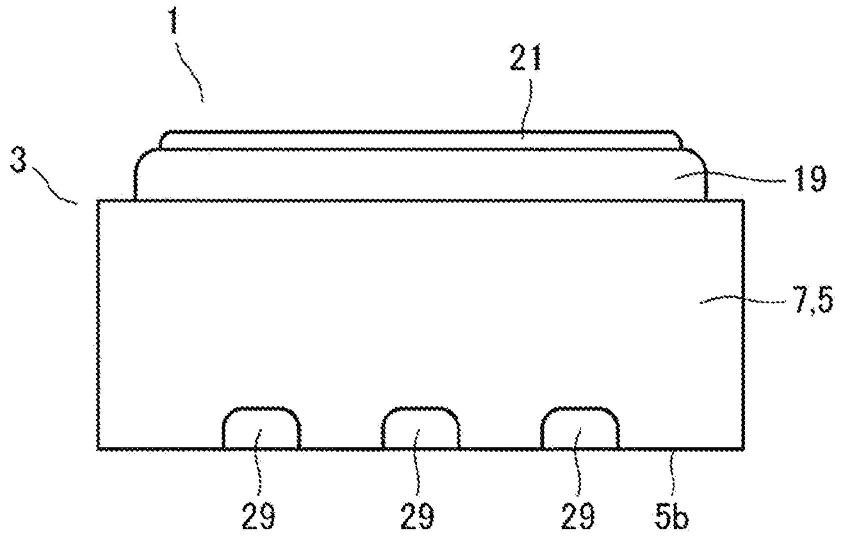
FIG. 5 is a side view of the sensor module provided with the installation terminals illustrated in FIG. 4 in the embodiment.
Figure 6:
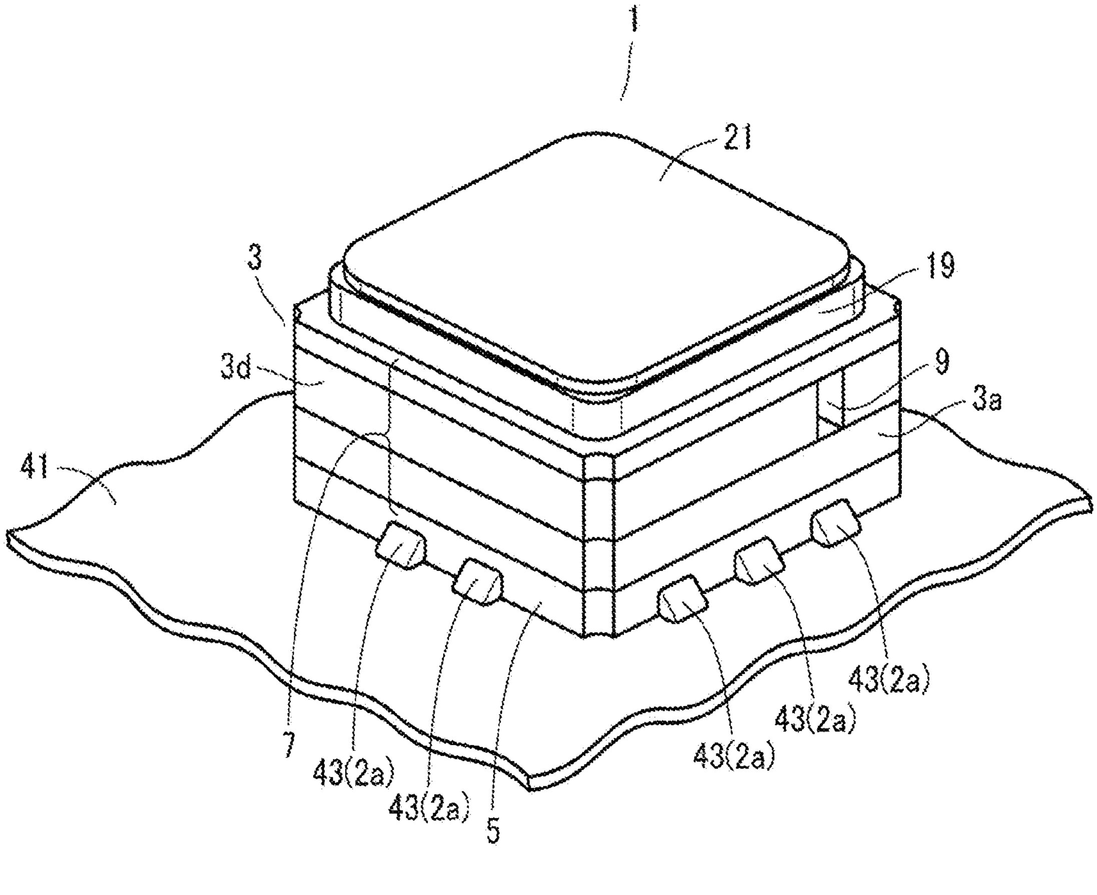
FIG. 6 is a perspective view illustrating an example of a state in which the sensor module is mounted on an installation board in the embodiment.

As illustrated in FIG. 5, end surfaces of the corresponding installation terminals 29 (installation terminal 29*a*, installation terminals 29*b*) are exposed on the surfaces flush with the side surface portion 7 in the bottom surface portion 5 of the package 3. As illustrated in FIG. 6, the sensor module 1 is installed on the installation board 41. The installation terminals 29 of the sensor module 1 and corresponding circuit patterns (not illustrated) formed on the installation board 41 are bonded by, for example, solder. In this case, solder fillets 43 are formed on the exposed end surfaces of the installation terminals 29. The sensor module 1 according to the embodiment is configured in this way.

The opening 9 for allowing communication between the space inside the package 3 and the outside is formed on the side surface portion 7 (first plane portion 3*a*) of the package 3 in the sensor module 1. This can prevent foreign objects and any other objects from entering the space inside the package 3. This will be described in comparison with a sensor module according to a comparative example.

Figure 7:
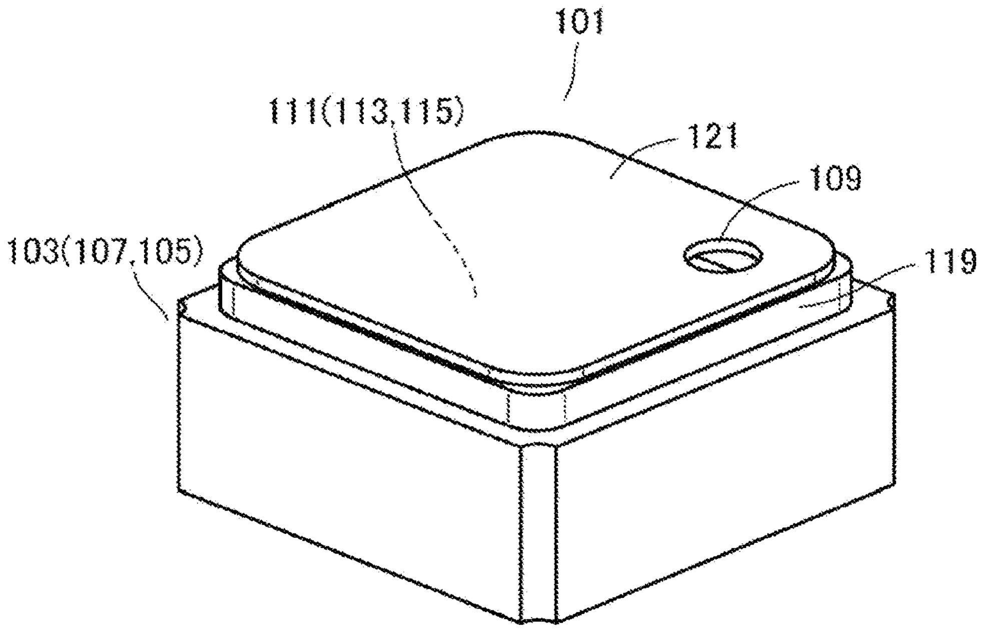
FIG. 7 is a perspective view illustrating an example of a sensor module according to a comparative example.

As illustrated in FIG. 7, a sensor module 101 according to the comparative example includes a box-shaped package 103, a sensor unit 111, and a cover member 121. The package 103 includes a bottom surface portion 105 and a side surface portion 107. The sensor unit 111 is housed in the package 103. The sensor unit 111 includes a pressure sensor body 113 and an electronic component 115.

The cover member 121 is attached to the package 103 through a cover member bonding member 119. An opening 109 for allowing communication between the space inside the package 103 housing the sensor unit 111 and the outside of the package 103 is formed on the cover member 121. The size of the opening 109 is, for example, 0.3 mmφ.

The sensor module 101 is installed on an installation board (not illustrated) and used. If a foreign object drifts in an upper part of the sensor module 101 in this case, the foreign object may easily enter the inside of the package 103 from the opening 109 formed on the cover member 121. If the foreign object enters the inside of the package 103 housing the sensor unit 111, the pressure sensing by the pressure sensor body 113 may be adversely affected.

In contrast to the sensor module 101 according to the comparative example, the opening 9 is formed on the side surface portion 7 (first plane portion 3*a*) of the package 3 in the sensor module 1 according to the embodiment. This can prevent a foreign object from entering the space inside the package 3 from the opening 9 formed on the side surface portion 7 of the package 3 when the foreign object drifts in an upper part of the installation board 41 (see FIG. 6) provided with the sensor module 1, as compared to the case in which the opening 109 is formed on the cover member 121 (see FIG. 7).

Variation of Installation Terminals 29

Another example of the plurality of installation terminals 29 arranged on the installation surface 5*b* in the bottom surface portion 5 of the package 3 will be described.

Figure 8:
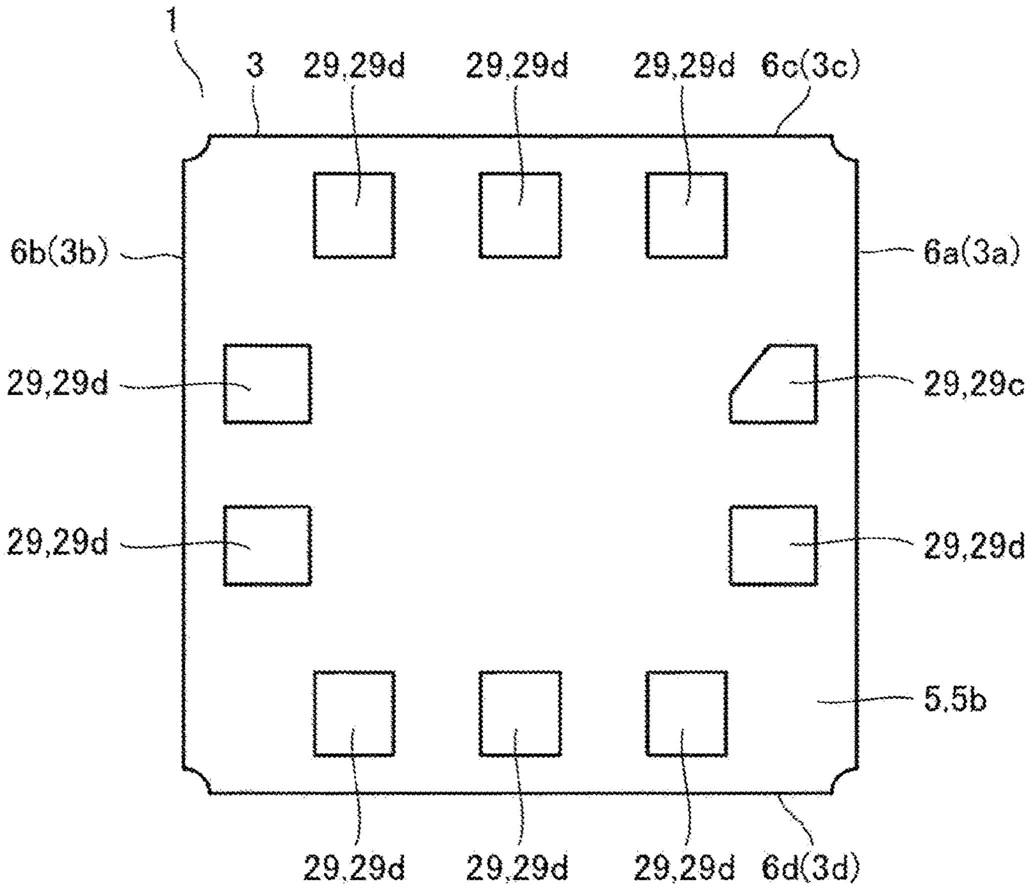
FIG. 8 is a bottom view illustrating another example of the installation terminals arranged on the bottom surface portion of the sensor module in the embodiment.

As illustrated in FIG. 8, the installation terminals 29 may be formed in such a manner as to extend from positions separated by a distance from the positions corresponding to the ends of the package 3 toward the inside of the installation surface 5*b*. The installation terminals 29 include one installation terminal 29*c* and nine installation terminals 29*d*. The installation terminal 29*c* serves as a positioning terminal (pin) for adjusting the position of the sensor module 1 with respect to the installation board 41 (see FIG. 6), and the pattern (plane shape) of the installation terminal 29*c* is different from the pattern of the installation terminals 29*d*.

Figure 9:
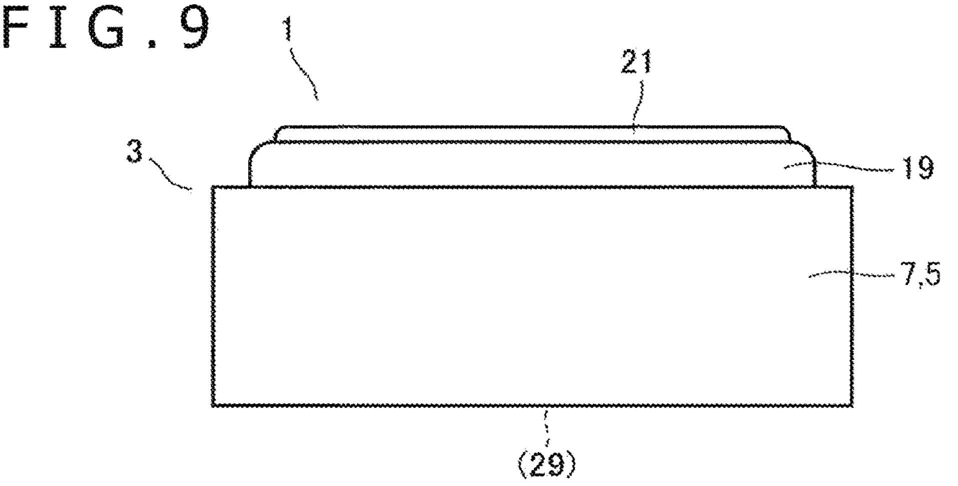
FIG. 9 is a side view of the sensor module provided with the installation terminals illustrated in FIG. 8 in the embodiment.

One installation terminal 29*c* and one installation terminal 29*d* are arranged in such a manner as to extend from the end portion 6*a* toward the end portion 6*b*. Two installation terminals 29*d* are arranged in such a manner as to extend from the end portion 6*b* toward the end portion 6*a*. Three installation terminals 29*d* are arranged in such a manner as to extend from the end portion 6*c* toward the end portion 6*d*. Three installation terminals 29*d* are arranged in such a manner as to extend from the end portion 6*d* toward the end portion 6*c*. In this case, the end surfaces of the corresponding installation terminals 29 (installation terminal 29*c*, installation terminals 29*d*) are not exposed on the surfaces flush with the side surface portion 7 in the bottom surface portion 5 of the package 3 as illustrated in FIG. 9.

The installation terminals 29 and the corresponding circuit patterns formed on the installation board 41 (see FIG. 6) are also bonded by solder to install the sensor module 1 configured as described above on the installation board 41.

Structure of Bumps 31

Modes of mounting the sensor unit 11 on the package 3 (bottom surface portion 5) will next be described. As described above, the sensor unit 11 is electrically connected to the installation terminals 29 arranged on the installation surface 5*b* (bottom surface portion 5), through the bumps 31 located between the mount surface 5*a* (bottom surface portion 5) and the sensor unit 11.

First Example

Figure 10:
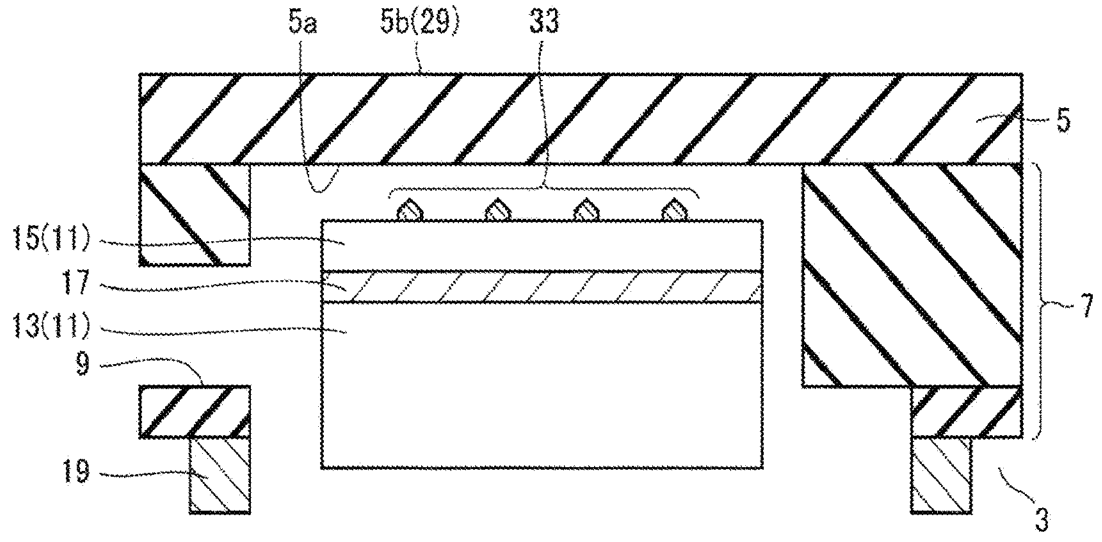
FIG. 10 is a cross-sectional view illustrating a process for describing a first example of a formation method of bumps in the embodiment.
Figure 11:
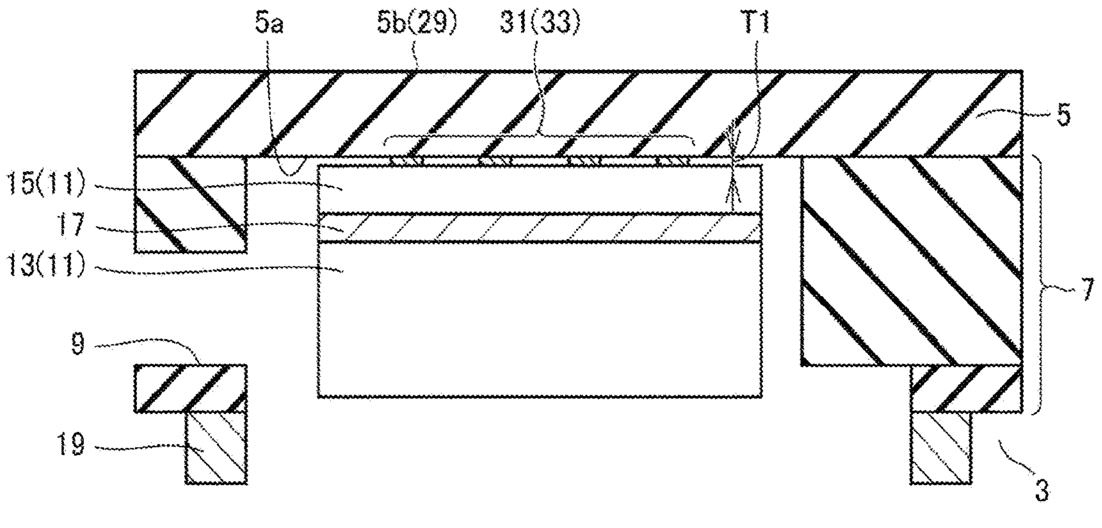
FIG. 11 is a cross-sectional view illustrating a process executed after the process illustrated in FIG. 10 in the embodiment.

An example of the structure of the bumps 31 includes bumps 31 formed by bumps 33 on the sensor unit side arranged in advance on the sensor unit 11. FIGS. 10 and 11 illustrate a series of processes of forming the bumps 31.

In this case, the sensor unit 11 is arranged on the lower side, and the package 3 is arranged on the upper side. In this state, the sensor unit 11 and the package 3 are brought close to each other to form the bumps 31. A distance T1 (see FIG. 11) between the sensor unit 11 and the mount surface 5*a* (bottom surface portion 5) can be reserved by forming the bumps 31.

Second Example

Figure 12:
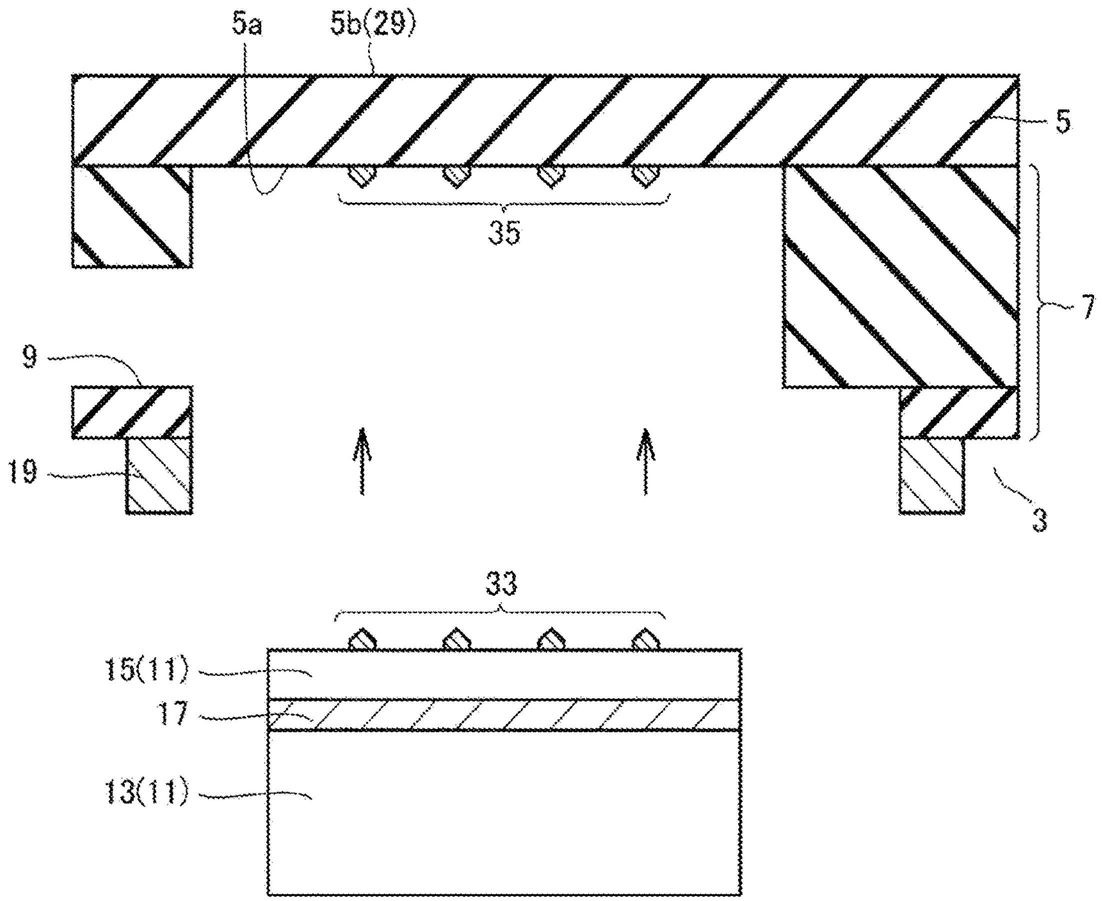
FIG. 12 is a cross-sectional view illustrating a process for describing a second example of the formation method of the bumps in the embodiment.
Figure 13:
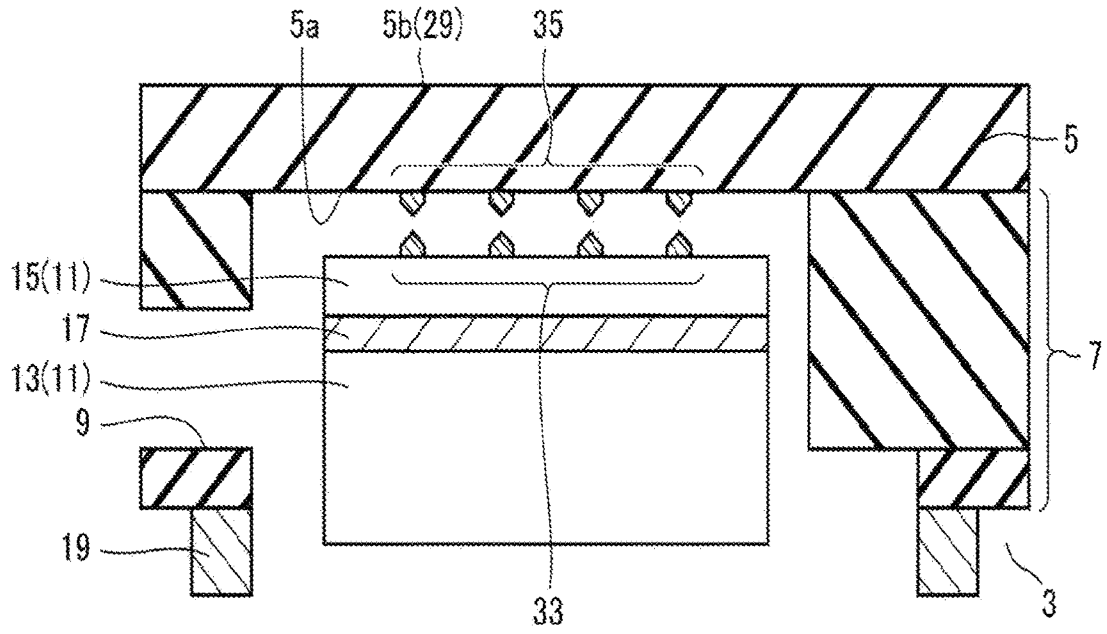
FIG. 13 is a cross-sectional view illustrating a process executed after the process illustrated in FIG. 12 in the embodiment.
Figure 14:
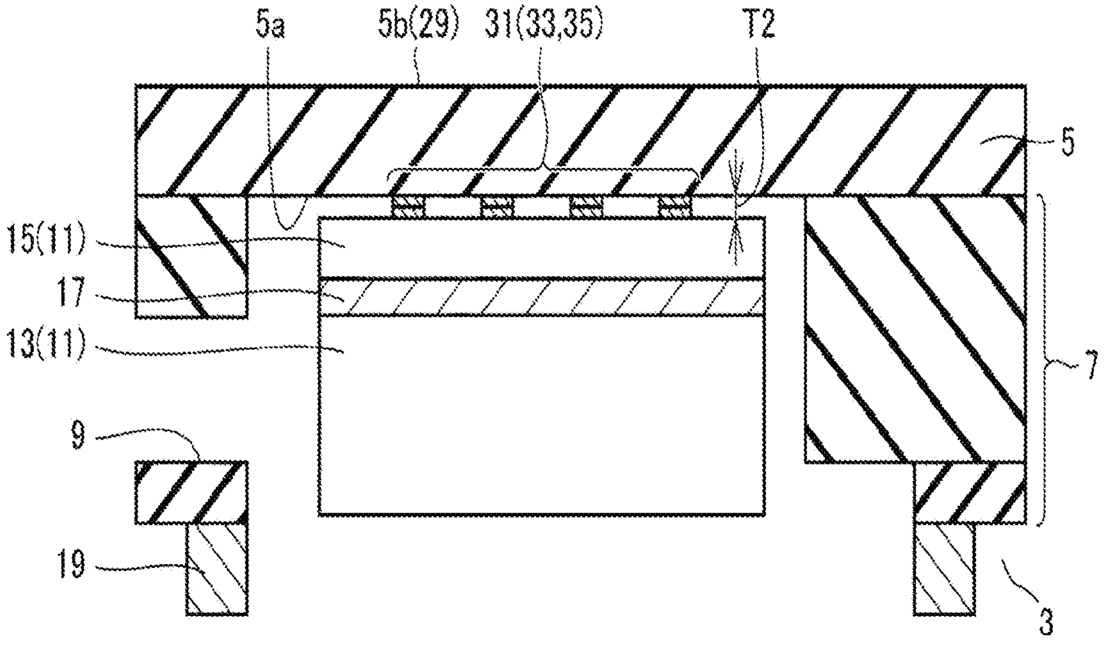
FIG. 14 is a cross-sectional view illustrating a process executed after the process illustrated in FIG. 13 in the embodiment.

Another example of the structure of the bumps 31 includes composite bumps 31 in which the bumps 33 on the sensor unit side arranged in advance on the sensor unit 11 and bumps 35 on the installation surface side arranged in advance on the installation surface 5*b* are bonded. FIGS. 12, 13, and 14 illustrate a series of processes of forming the composite bumps 31. A distance T2 (see FIG. 14) longer than the distance T1 can be reserved between the sensor unit 11 and the mount surface 5*a* (bottom surface portion 5) by forming the composite bumps 31.

More specifically, the height (position) of the pressure sensor body 13 (sensor unit 11) from the mount surface 5*a* (bottom surface portion 5) can be adjusted by the thickness of the bumps 31, and the height of the opening 9 with respect to the pressure sensor body 13 can be adjusted. Note that there is an interface between the bumps 33 on the sensor unit side and the bumps 35 on the installation surface side in the case of the composite bumps 31, and this distinguishes the structure of the composite bumps 31 from the structure of the bumps 31 in the case of the first example.

In the case of the composite bumps 31, the same kind of metal can be bonded by using the same metal, such as gold (Au), for the bumps 33 on the sensor unit side and the bumps 35 on the installation surface side. This can further increase the bond strength, and poor bonding can be reduced.

The ceramic layered structure is described as an example of the package 3 as a box-shaped structure that houses the sensor unit 11 in the sensor module. The package 3 is not limited to the ceramic layered structure, and the package 3 may be, for example, a box-shaped metal. In addition, the values of dimensions and the numbers of layers described in the embodiment are examples, and they are not limited to the described numerical values.

Note that the sensor module described in the embodiment can be combined in various ways as necessary.

The embodiment disclosed this time is illustrative, and the embodiment is not limited to this. The present disclosure is illustrated by the claims rather than the scope described above, and all changes within the meaning and range of equivalents of the claims are intended to be included in the present disclosure.

The present disclosure includes the following modes.

Supplement 1

A Sensor Module Including:
- a box-shaped structure that includes a bottom surface portion and a side surface portion arranged upright with respect to the bottom surface portion;
- a sensor unit that is mounted on the bottom surface portion of the box-shaped structure and that includes a pressure sensor body; and
- a cover member that is placed on the side surface portion in such a manner as to cover the sensor unit, in which
- an opening for allowing communication between a space inside the box-shaped structure housing the sensor unit and outside is formed on the side surface portion in the box-shaped structure.

Supplement 2

The Sensor Module According to Supplement 1, in which
- the bottom surface portion includes
  - a first surface on which the sensor unit is mounted, and
  - a second surface positioned on an opposite side of the first surface, and
- a plurality of installation terminals electrically connected to the sensor unit are arranged on the second surface.

Supplement 3

The Sensor Module According to Supplement 2, in which
- the plurality of installation terminals include a positioning terminal that specifies an arrangement position with respect to an installation board, and
- the opening is formed at a position corresponding to the positioning terminal.

Supplement 4

The Sensor Module According to Supplement 3, in which
- the box-shaped structure includes four plane portions with a square shape in plan view in which the cover member is viewed from an upper side,
- the four plane portions include
  - one plane portion that corresponds to one side of the square shape, and
  - another plane portion that is connected to the one plane portion and that corresponds to another side of the square shape, and
- the opening is formed at a position closer to the other plane portion with respect to a center in a length direction of the one side of the one plane portion.

Supplement 5

The sensor module according to any one of supplements 2 through 4, further including:

bumps located between the bottom surface portion and the sensor unit and configured to electrically connect the sensor unit and the installation terminals, in which the bumps are formed as composites of first portions connected to the first surface of the bottom surface portion, and second portions connected to the sensor unit.

Supplement 6

The sensor module according to any one of supplements 2 through 5, in which the plurality of installation terminals are formed in such a manner as to extend, in the second surface of the bottom surface portion, from positions corresponding to ends of the box-shaped structure toward inside of the second surface.

Supplement 7

The sensor module according to any one of supplements 2 through 5, in which the plurality of installation terminals are formed in such a manner as to extend, in the second surface of the bottom surface portion, from positions separated by a distance from positions corresponding to ends of the box-shaped structure toward inside of the second surface.

Supplement 8

The sensor module according to any one of supplements 1 through 7, in which the opening is formed at a height position from the bottom surface portion where the opening faces the pressure sensor body.

Supplement 9

The sensor module according to any one of supplements 1 through 8, in which the box-shaped structure includes a ceramic layered structure.

According to the sensor module of an embodiment of the present disclosure, the opening for allowing communication between the space inside the box-shaped structure housing the sensor unit and the outside is formed on the side surface portion in the box-shaped structure. This can prevent the foreign object from entering the space inside the box-shaped structure.

The present disclosure is effectively used for a sensor module with a sensor unit including a pressure sensor body.

What is claimed is:

1. A sensor module, comprising:

a box-shaped structure that includes a bottom surface portion and a side surface portion arranged upright with respect to the bottom surface portion, wherein the bottom surface portion includes:

a first surface, and a second surface positioned on an opposite side of the first surface;

a sensor unit that is mounted on the first surface of the bottom surface portion of the box-shaped structure and that includes a pressure sensor body, wherein a plurality of installation terminals are electrically connected to the sensor unit, the plurality of installation terminals are arranged on the second surface, and the plurality of installation terminals include a positioning terminal that specifies an arrangement position with respect to an installation board; and a cover member that is placed on the side surface portion in such a manner as to cover the sensor unit, wherein an opening for allowing communication between a space inside the box-shaped structure housing the sensor unit and outside is formed on the side surface portion in the box-shaped structure, and the opening is formed at a position corresponding to the positioning terminal.

2. The sensor module according to claim 1, wherein the box-shaped structure further includes four plane portions with a square shape in plan view in which the cover member is viewed from an upper side, the four plane portions include a first plane portion that corresponds to a first side of the square shape, and a second plane portion that is connected to the first plane portion and that corresponds to a second side of the square shape, the second side of the square shape is different from the first side of the square shape, and the opening is formed at a position closer to the second plane portion with respect to a center in a length direction of the first side of the first plane portion.

3. The sensor module according to claim 1, further comprising:

bumps located between the bottom surface portion and the sensor unit and configured to electrically connect the sensor unit and the plurality of installation terminals, wherein the bumps are formed as composites of first portions connected to the first surface of the bottom surface portion, and second portions connected to the sensor unit.

4. The sensor module according to claim 1, wherein the plurality of installation terminals are formed in such a manner as to extend, in the second surface of the bottom surface portion, from positions corresponding to ends of the box-shaped structure toward inside of the second surface.

5. The sensor module according to claim 1, wherein the plurality of installation terminals are formed in such a manner as to extend, in the second surface of the bottom surface portion, from positions separated by a distance from positions corresponding to ends of the box-shaped structure toward inside of the second surface.

6. The sensor module according to claim 1, wherein the opening is formed at a height position from the bottom surface portion where the opening faces the pressure sensor body.

7. The sensor module according to claim 1, wherein the box-shaped structure further includes a ceramic layered structure.

* * * * *